United States Patent
Childers et al.

(10) Patent No.: US 10,162,122 B2
(45) Date of Patent: *Dec. 25, 2018

(54) APPARATUS FOR AND METHOD OF TERMINATING A MULTI-FIBER FERRULE

(71) Applicant: US Conec, Ltd., Hickory, NC (US)

(72) Inventors: Darrell R. Childers, Hickory, NC (US); Jillcha Fekadu Wakjira, Hickory, NC (US); Michael E. Hughes, Hickory, NC (US); Joseph P. Howard, Hickory, NC (US); Arnold Deal, III, Hildebran, NC (US); Dirk Eric Schoellner, Hickory, NC (US)

(73) Assignee: US Conec, Ltd, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,868

(22) Filed: Jun. 8, 2017

(65) Prior Publication Data

US 2018/0011253 A1 Jan. 11, 2018

Related U.S. Application Data

(63) Continuation of application No. 14/697,411, filed on Apr. 27, 2015, now Pat. No. 96,782,818.

(60) Provisional application No. 61/984,089, filed on Apr. 25, 2014.

(51) Int. Cl.
G02B 6/36 (2006.01)
G02B 6/38 (2006.01)
G02B 6/25 (2006.01)

(52) U.S. Cl.
CPC ............ *G02B 6/3616* (2013.01); *G02B 6/25* (2013.01); *G02B 6/3885* (2013.01); *G02B 6/3898* (2013.01)

(58) Field of Classification Search
USPC ... 156/250, 267, 272.2, 272.8, 272.3, 273.5, 156/293, 379.6, 379.8, 510; 83/451, 452, 83/456, 465, 466
See application file for complete search history.

(56) References Cited

U.S. PATENT DOCUMENTS

| | | |
|---|---|---|
| 5,421,928 A | 6/1995 | Knecht et al. |
| 5,501,385 A | 3/1996 | Halpin |
| 6,256,448 B1 | 7/2001 | Shahid |
| 7,082,250 B2 | 7/2006 | Jones et al. |
| 8,881,553 B2 | 11/2014 | Childers et al. |
| 9,268,091 B2 | 2/2016 | Jong |
| 9,678,281 B2 * | 6/2017 | Childers .............. G02B 6/3885 |
| 2004/0047587 A1 | 3/2004 | Osborne |
| 2009/0010602 A1 | 1/2009 | Nothofer |
| 2010/0202735 A1 | 8/2010 | Childers |
| 2012/0154922 A1 | 6/2012 | Briand et al. |
| 2012/0269488 A1 | 10/2012 | Danley |

* cited by examiner

*Primary Examiner* — Sing P Chan
(74) *Attorney, Agent, or Firm* — Michael L. Leetzow, P.A.

(57) ABSTRACT

An apparatus allows a plurality of optical fibers to be held together during the termination process. A handling device holds the optical fibers while a cleaving device allows for consistent cleaving of the optical fibers to ensure the ends are cleaved consistently. The handling device may also be used during the fixation of the optical fibers in the fiber optic ferrule. A method for terminating the plurality of optical fiber is also provided.

18 Claims, 13 Drawing Sheets

APPARATUS FOR AND METHOD OF TERMINATING A MULTI-FIBER FERRULE

REFERENCE TO RELATED CASE

This application claims priority under 35 U.S.C. § 119 (e) to provisional application No. 61/984,089 filed on Apr. 25, 2014, and under 35 U.S.C. § 120 to U.S. Ser. No. 14/697,411, filed on Apr. 27, 2015, the contents of both applications are hereby incorporated by reference in their entirety.

BACKGROUND OF THE INVENTION

Field of the Invention

Terminating fiber optic ferrules that have integral lenses requires addressing concerns that differ when terminating fiber optic ferrules where the ends of the optical fibers are terminated at the end face of the fiber optic ferrules. Fiber optic ferrules with integral lenses typically have a stop plane near the front end of the fiber optic ferrule. The optical fibers are preferably disposed against the stop plane. If the optical fibers are not against the fiber optic stop plane, there is signal loss. In fact, distances between the ends of the optical fibers and the stop plane that are greater than 50 microns cause too much signal loss and the fibers are typically terminated again in a new fiber optic ferrule. Such issues occur when sets of a plurality of optical fibers are processed separately and then are assembled just before they are inserted into the fiber optic ferrule. The issues with the separate processing can include not removing sufficient amounts of matrix off fiber ribbons, having different lengths of optical fibers within a fiber ribbon, etc.

Thus, an apparatus and method of preparing optical fibers and securing them in a multi-fiber optic ferrule is needed that allows for the optical fibers inserted into the fiber optic ferrule to be processed while all maintained in a fixed relationship to one another.

SUMMARY OF THE INVENTION

The present invention is directed to a method of terminating a plurality of optical fibers that includes assembling the plurality of optical fibers in a stack at least two rows of optical fibers, securing the stack of a plurality of optical fibers in a handling device to prevent slipping of the rows the optical fibers relative to one another in the stack, cleaving the plurality of optical fibers while the plurality of optical fibers are secured in the handling device; inserting the plurality of optical fibers into a multi-fiber optical ferrule while the plurality of optical fibers are secured in the handling device, the multi-fiber optical ferrule having a front wall to engage ends of the optical fibers inserted therein, and securing the plurality of optical fibers in the multi-fiber optical ferrule while the plurality of optical fibers are secured in the handling device.

In some embodiments, the method also includes the step of providing a cleaving device for attachment to the handling device, the cleaving tip having a plurality of slots, each of the plurality of slots being disposed to accept one row of the optical fibers and having a portion of the cleaving device between each of the plurality of slots to protect an adjacent row of optical fibers from the cleaving laser.

According to another aspect of the present invention, an apparatus for cleaving a plurality of rows of optical fibers, the plurality of optical fibers being arranged in a stack of optical fibers, the stack of optical fibers having a plurality of rows, that includes a handling device having a base member and a top member, the base member having a channel therein to receive at least along a portion of a length thereof the stack optical fibers and a top member to engage and secure the stack of optical fibers within the channel to prevent the slipping of the plurality of optical fibers relative to one another in the stack, and a cleaving device having a front end and a back end and being attached by the back end to the handling device, the cleaving device having a plurality of planar members defining a plurality of slots adjacent the front end, each of the plurality of slots configured to receive a single row of the stack of optical fibers, the planar members extending beyond the front end and having a front face directed away from the cleaving device, the front face having a predetermined angle relative to an axis through the slots.

In some embodiments, the predetermined angle is greater than about 106.4°.

In yet another aspect, a cleaving device used in cleaving a plurality of rows of optical fibers, the plurality of optical fibers being arranged in a stack of optical fibers, the stack of optical fibers having a plurality of rows that includes a main body having a front end and a back end and an opening extending therebetween to accept the plurality of rows of optical fibers, and a plurality of planar members adjacent the front end of the main body defining a plurality of slots extending from the opening adjacent the front end and past the front end of the main body, each of the plurality of slots configured to receive a single row of the stack of optical fibers, the planar members having a front face directed away from the cleaving device, the front face having a predetermined angle relative to an axis through the slots.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
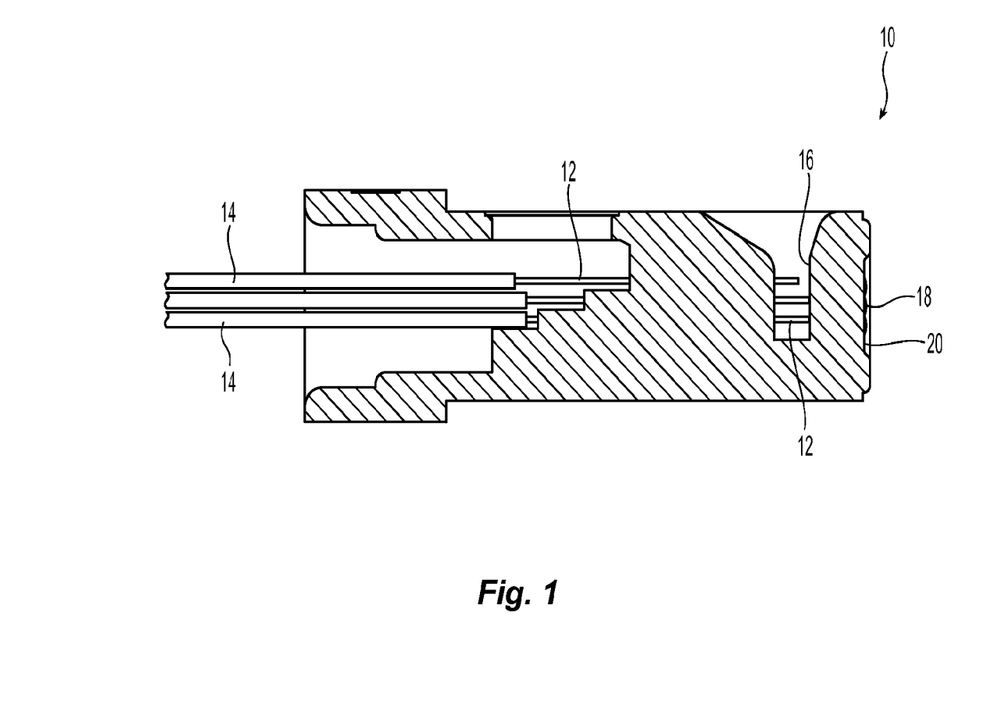
FIG. 1 is a cross sectional view of a lensed ferrule according to the prior art.
Figure 2:
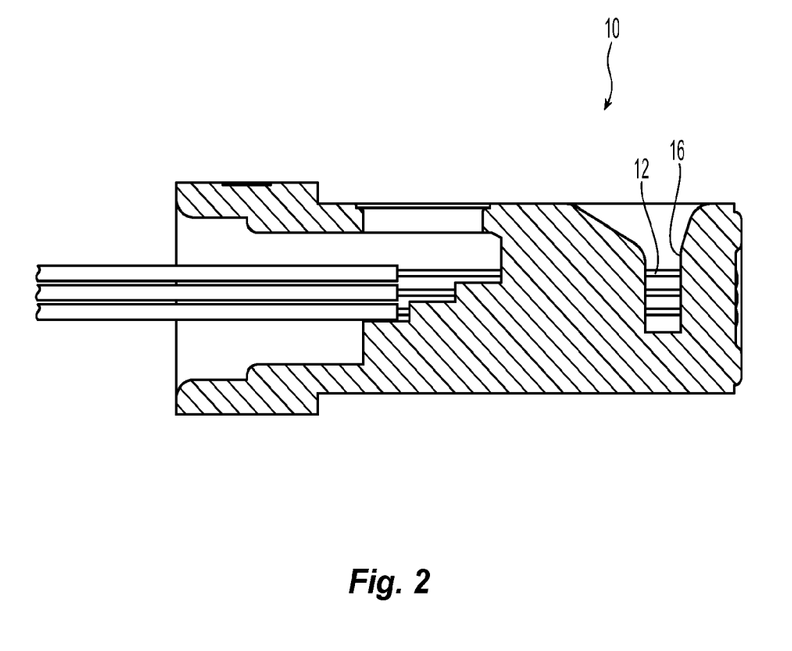
FIG. 2 is a cross sectional view of a lensed ferrule according to one embodiment of the present invention.

Referring to FIG. 1, a lensed multi-fiber ferrule 10 illustrates the problem of processing optical fibers 12 and, in this case, three fiber optic ribbons 14 with a plurality of optical fibers 12 in each one. The optical fibers 12 in the top ribbon 14 does not extend to the stop plane 16 in the lensed multi-fiber ferrule 10. As is recognized in the art, the lenses 18 are on the front face 20 of the lensed multi-fiber ferrule 10. As illustrated in FIG. 2, after using the present invention, the optical fibers 12 are much closer to the stop plane 16 in the lensed multi-fiber ferrule 10. In fact, all of the optical fibers 12 are within 50 microns of the stop plane 16.

Figure 3:
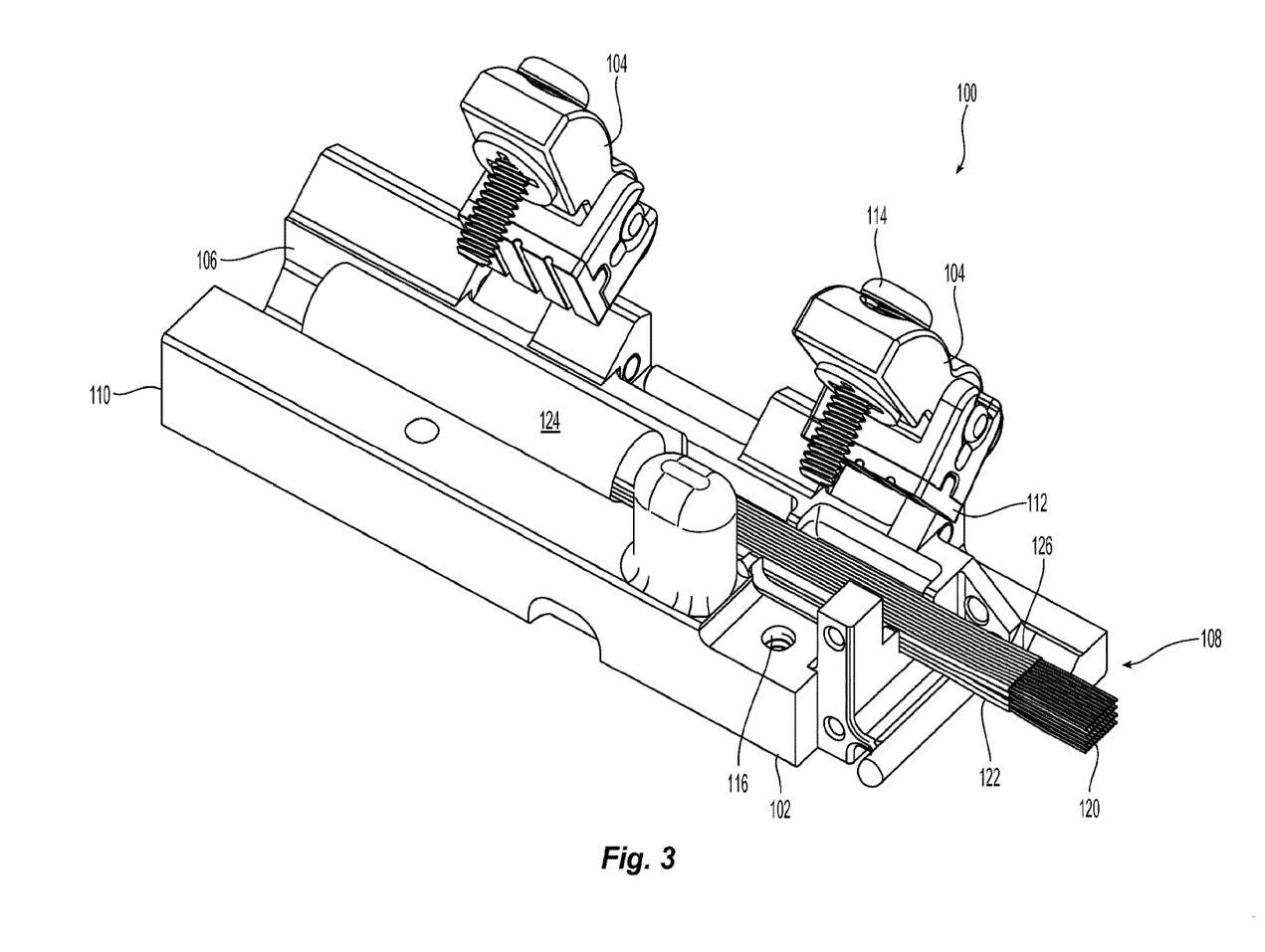
FIG. 3 is a perspective view of a handling device according to one embodiment of the present invention.

Turning to FIG. 3, one embodiment of a handling device 100 according to the present invention is illustrated. The handling device 100 has base member 102 and a top member 104, the base member 102 has a channel 106 to accept a plurality of optical fibers 120. It should be noted that the plurality of optical fibers 120 may take any appropriate form. As illustrated in FIG. 3, the plurality of optical fibers 120 have been ribbonized and four fiber optic ribbons 122 are provided in channel 106. The four fiber optic ribbons 122 are protected by a cable jacket 124. As is well known in the art, the four fiber optic ribbons 122 have a matrix covering 126 that must be removed prior to terminating the optical fibers 120 within a fiber optic ferrule. As can be seen in FIG. 3, the matrix has been removed and the bare optical fibers 120 are illustrated. It should be noted that the present invention can be used with more than or less than the four fiber optic ribbons 122 that are illustrated. For example, three fiber optic ribbons or even six fiber optic ribbons could be use with both the method and the apparatus disclosed herein. It should be clear that the number of fiber optic ribbons 122 should correspond to the number of rows of openings/lenses that are present in the fiber optic ferrule that is being terminated.

The handling device 100, as illustrated, has two top members 104, however the two top members 104 may be combined into a single top member and still fall within scope of the present invention. In this embodiment, the two top members 104 rotate relative to the base member 102 to engage and secure the optical fibers 120 disposed channel 106. The base member 102 has a front end 108 and a back end 110, with the bare optical fibers 120 disposed at the front end 108 and the cable jacket portion 124 disposed at the back end 110. The front top member 104 used to clamp the stack of four fiber optic ribbons 122. Preferably a rubber pad 112 is used on the underside of the front top member 104 to engage and retain the stack of four fiber optic ribbons 122 relative to one another (and the handling device 100). The front top member 104 preferably uses a screw 114 that engages a threaded opening 116 in the base member 102. A torque wrench is used with the screw 114 to control the vertical force exerted on the stack of fiber optic ribbons 122. The channel 106 may similarly be padded to prevent any undue force from being exerted on the optical fibers 120. The back top member 104 similarly has a rubber pad 112 to engage the cable jacket 124 to maintain it in place relative to the handling device 100. Rather than the rubber pad 112 it is also possible for a hard plastic pad to be used to secure the optical fibers 120 in the channel 106.

After the plurality of optical fibers 120 are secured within the handling device 100, the matrix 126 is removed from the ends of the fiber optic ribbons 122. In this way, the amount of matrix 126 removed from each of the fiber optic ribbons 122 would be the same as illustrated in FIG. 3. The ends of the optical fibers 120 in each of the fiber optic ribbons 122 are relatively close to one another. As will be discussed in greater detail below, and as known to one of ordinary skill in the art, the optical fibers 120 will need to be cleaved prior to insertion into the fiber optic ferrule 10 so the ends of the optical fibers 122 need not be perfectly aligned. With the matrix 126 removed from the optical fibers 120, the optical fibers are now ready to be cleaved.

Figure 4:
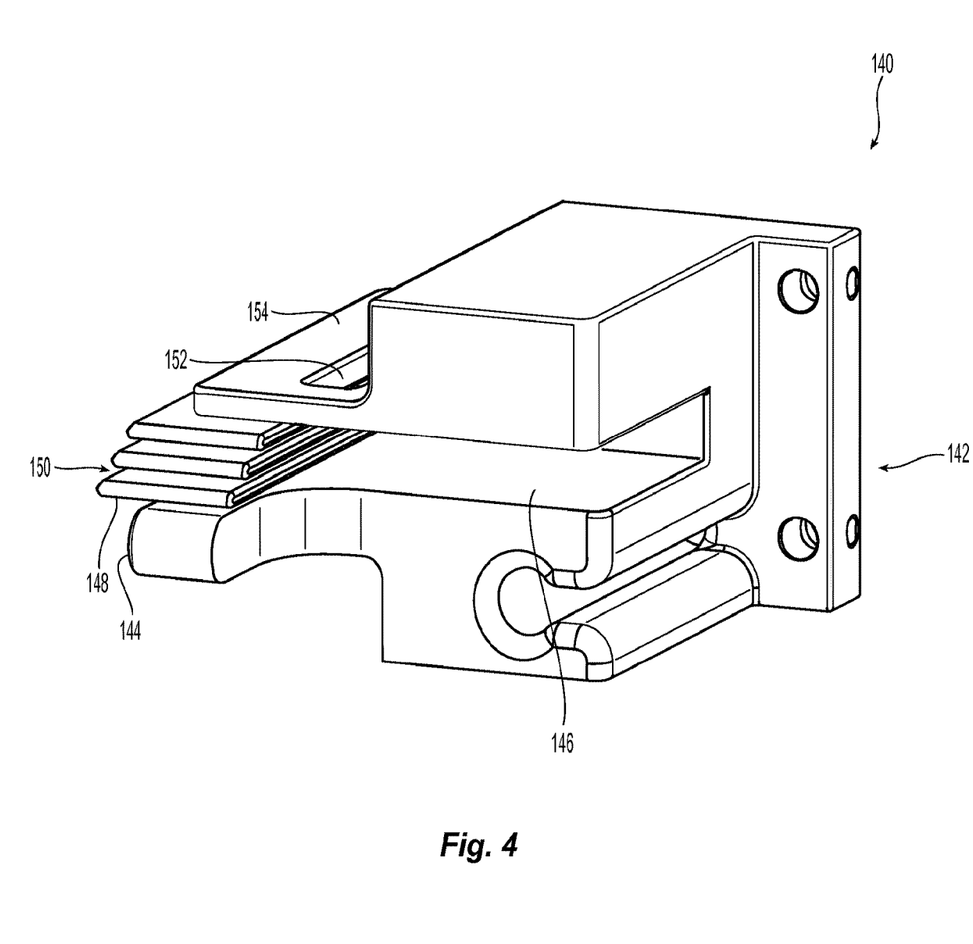
FIG. 4 is a perspective view of a cleaving device according to one embodiment of the present invention.
Figure 5:
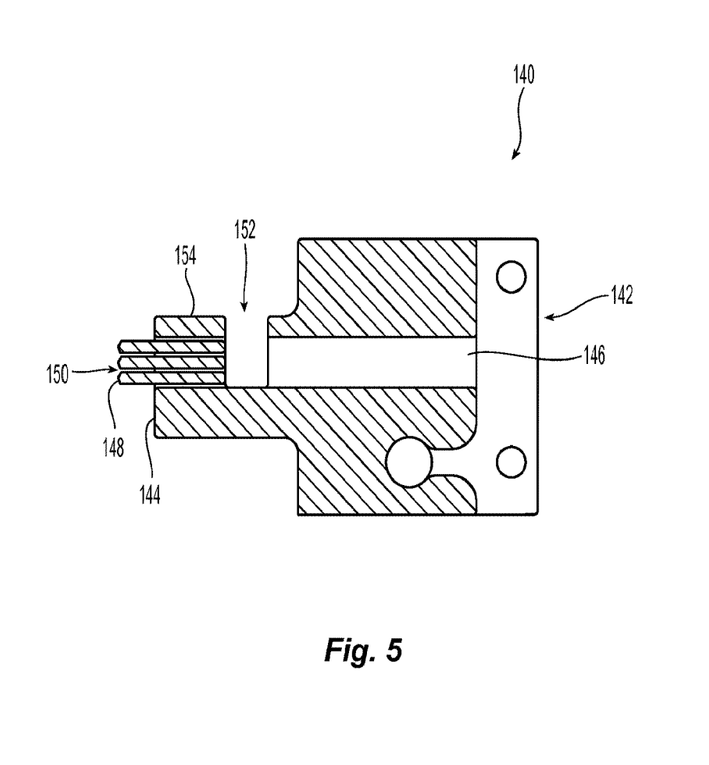
FIG. 5 is a cross section view of a cleaving device of FIG. 4.
Figure 5A:
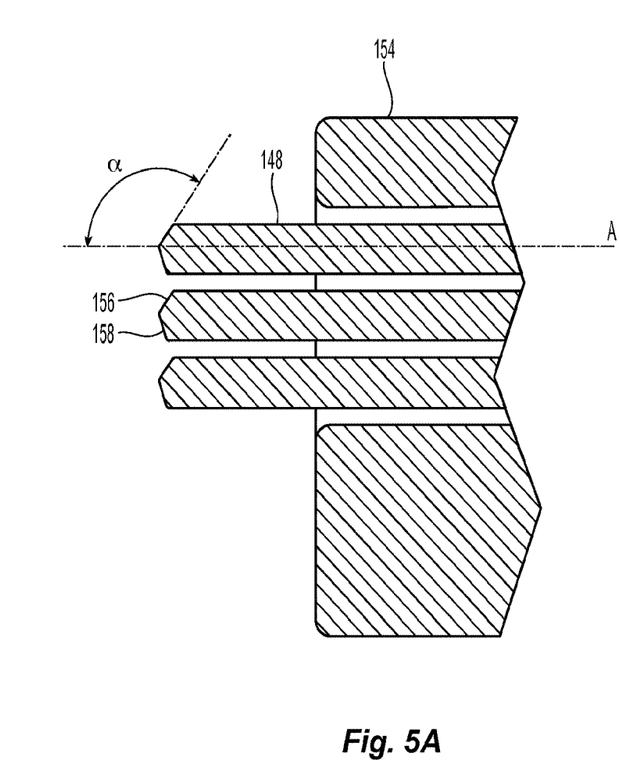
FIG. 5a is a detail view of an enlarged portion of the end of the cleaving device in FIG. 4.

One embodiment of a cleaving device 140 according to the present invention is illustrated in FIGS. 4-5A. The cleaving device 140 has a back end 142 that allows the cleaving device 140 to be removably attachable to the front end 108 of the handling device 100. See also FIG. 6. The cleaving device 140 has a front end 144 and an opening 146 extending between the front end 144 and the back end 142. The optical fibers 122 extend from the handling device 100 through the opening 146 and extend beyond front end 144 of the cleaving device 140. See FIG. 7 (the handling device 100 has been removed for clarity purposes, but the optical fibers 120 are still retained therein). The cleaving device 140 has a plurality of planar members 148 disposed within the opening 146 and extending beyond the front end 144. The plurality of planar members 148 define a plurality of slots 150 adjacent the front end 144. Each of the plurality of slots 150 is sized to receive one of the fiber optic ribbons 122 or one row of optical fibers 120. The cleaving device 140 may also have an opening 152 extending downward from a top surface 154 that is in communication with the opening 146. The opening 152 provides a user access to assist with the fiber optic ribbons 122 being inserted into the opening 146 from the back end 142 and through the slots 150.

As illustrated in detail in FIG. 5A, each of the planar members 148 has a front face divided between an upper front face 156 that is directed upward i.e. towards top surface 154 and away from the cleaving device 140 and a lower front face 158 that is directed downward and away. The upper front face 156 makes an angle α with a longitudinal axis A through the planar member 148 (which would also be parallel to an axis through the opening 150 and a longitudinal axis through opening 146.) The angle α is preferably greater then about 106.4° for reasons that will be given in detail below. However, the angle α may also be as great as 140° or anywhere in between. The lower front face 158 is configured to allow a cleaving laser to engage adjacent optical fibers 122 as explained below in conjunction with FIG. 9.

Figure 6:
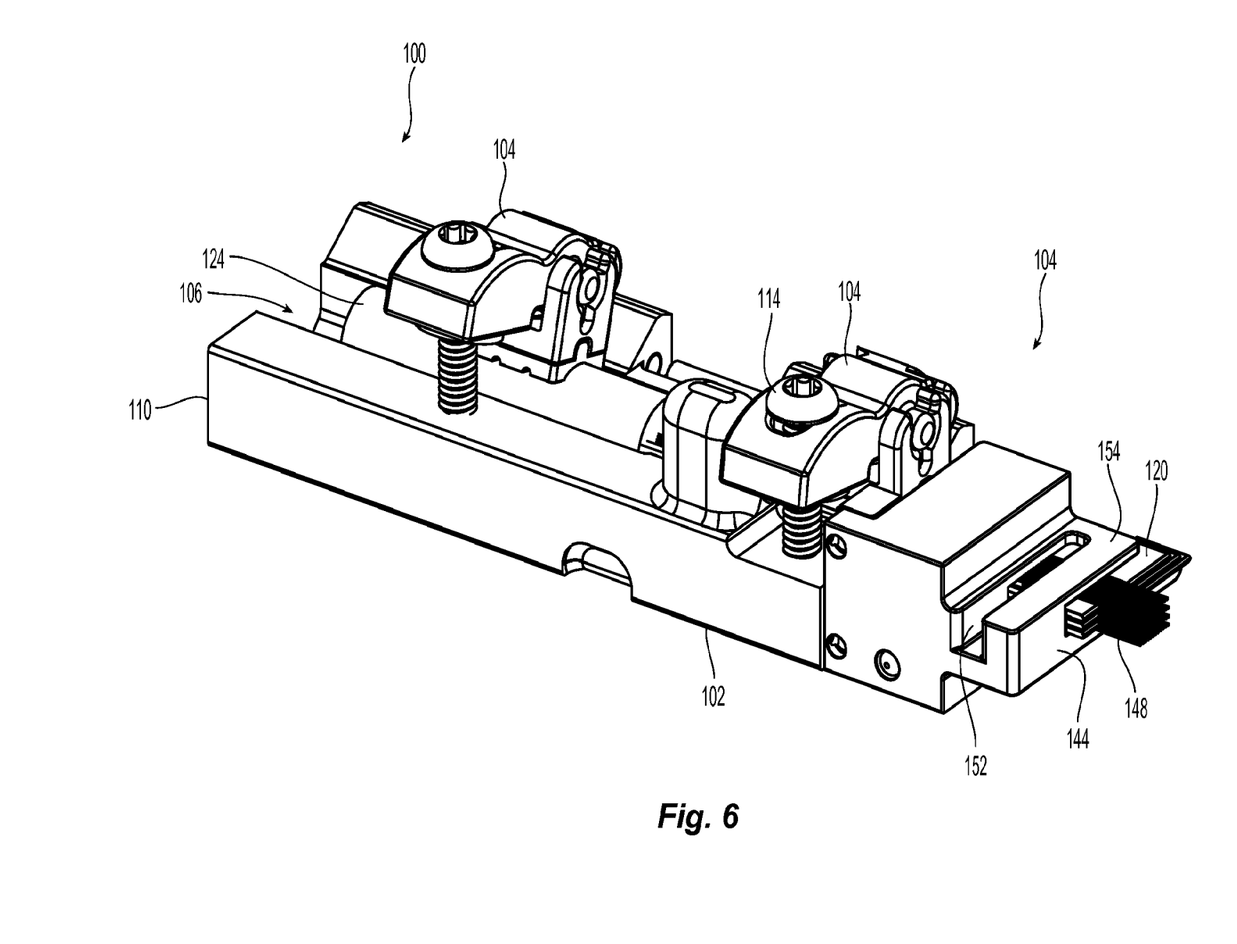
FIG. 6 is perspective view of a handling device with the cleaving device according to one embodiment of the present invention.
Figure 7:
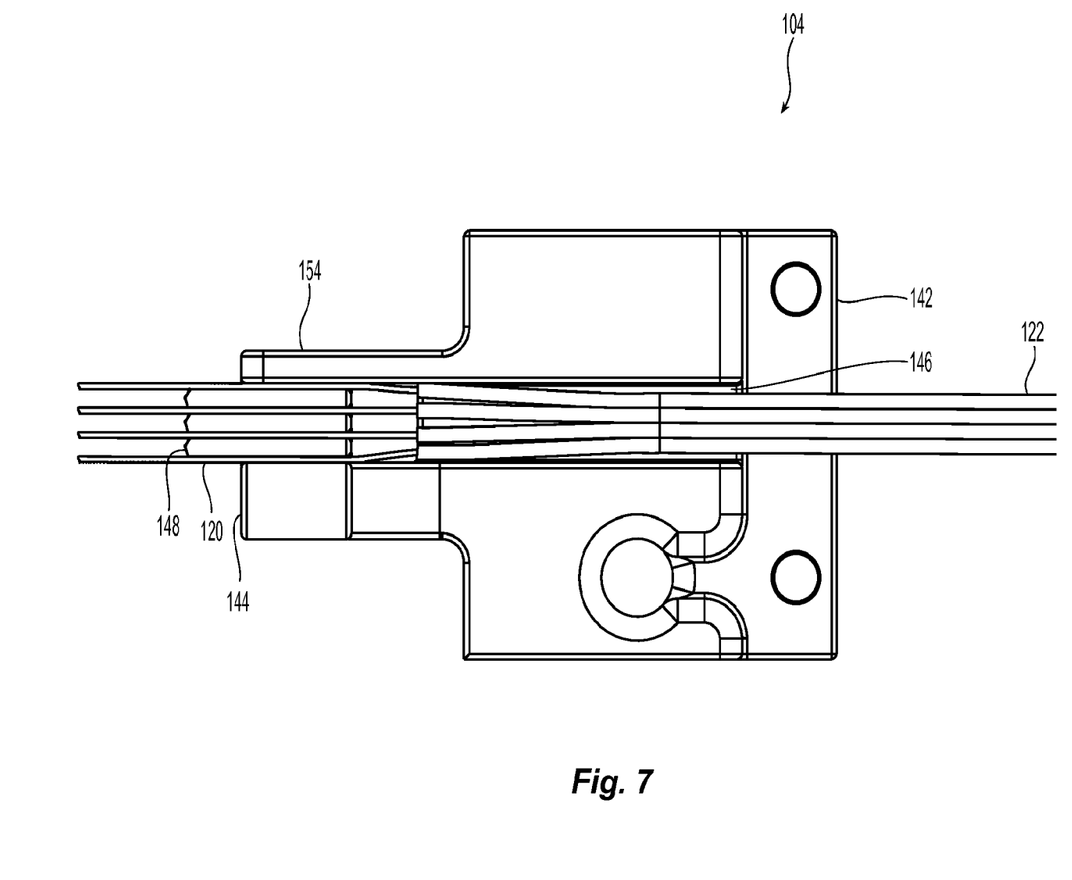
FIG. 7 is a cross section view of a cleaving device of FIG. 4 with the plurality of optical fibers disposed therein.
Figure 8:
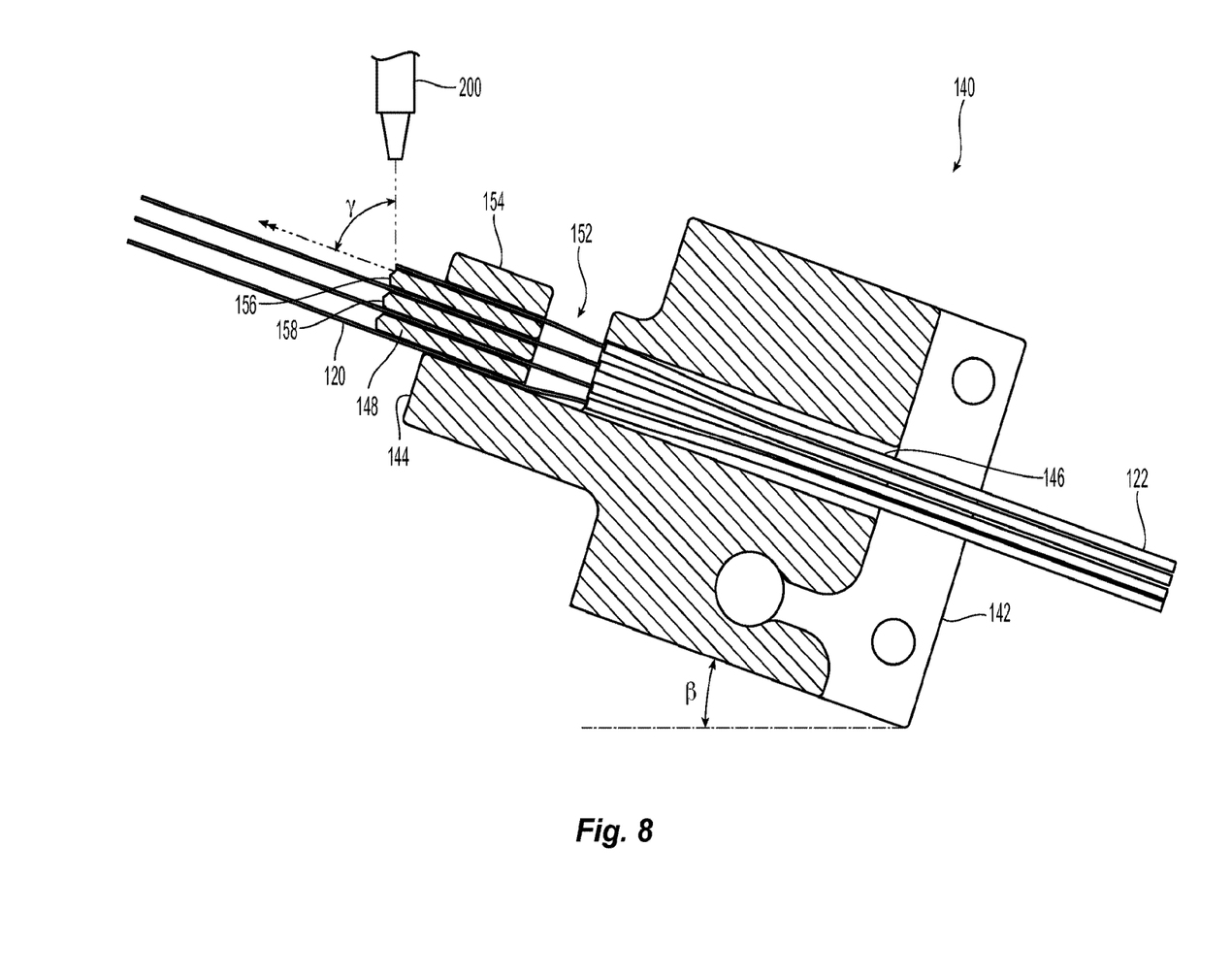
FIG. 8 is a cross section view of a cleaving device of FIG. 7 showing the cleaving laser cleaving a first row of optical fibers.

As illustrated in FIGS. 6-8, the optical fibers 120 extend beyond the front end 144 and the planar members 148 of the cleaving device 140. The length of optical fibers 122 extending beyond the planar members 148 (and in particular beyond the forward most portion of front faces 156, 158) is not critical. However, as will be recognized by one of skill in the art, the optical fibers 120 should extend at least beyond the end of the planar members 148 to provide a sufficient amount of the optical fibers 120 to be cleaved.

Turning now to FIG. 8, the process of cleaving the optical fibers 120 will be described. A cleaving laser 200 (schematically illustrated in FIG. 8) is directed toward the cleaving device 140 and the plurality of optical fibers 120 extending through the first slot 150 of the cleaving device 140. Rather than being oriented perpendicular to the axis of the optical fiber (i.e., longitudinal axis A), the cleaving device 140 (and also the handling device 100 still attached thereto) is tilted at a second predetermined angle ß. Preferably, the angle ß is 18.6°. As a result, the angle of the cleaving laser 200 with the optical fibers 120 is illustrated as angle γ, which would be 71.4°. Applicant has found this geometry provides a uniform end face on the optical fibers 120 when a CO2 laser is used with the cleaving device 140. Applicant has also discovered that the angle α formed by the upper front face 156 of the planar members 148 with the longitudinal axis A should be greater than 106.4°. This allows for the cleaving laser 200 to cleave the first layer of optical fibers without affecting the subsequent layers of optical fibers 120. The upper front faces 156 the planar members 148 reflect the CO2 light after it cleaves the optical fibers 120, thereby protecting the underlying optical fibers 120. The upper front face 156 preferably has a reflective material to reflect the cleaving laser light including, for example, molybdenum, silicone, chrome, copper, or a stainless steel high in either molybdenum or chrome. Similarly a gold or silver coating may also be used on the upper front face 156. Alternatively, rather than reflect the light away, the upper front face 156 may also have a light-absorbing surface to prevent the light from damaging the neighboring optical fibers 120.

Figure 9:
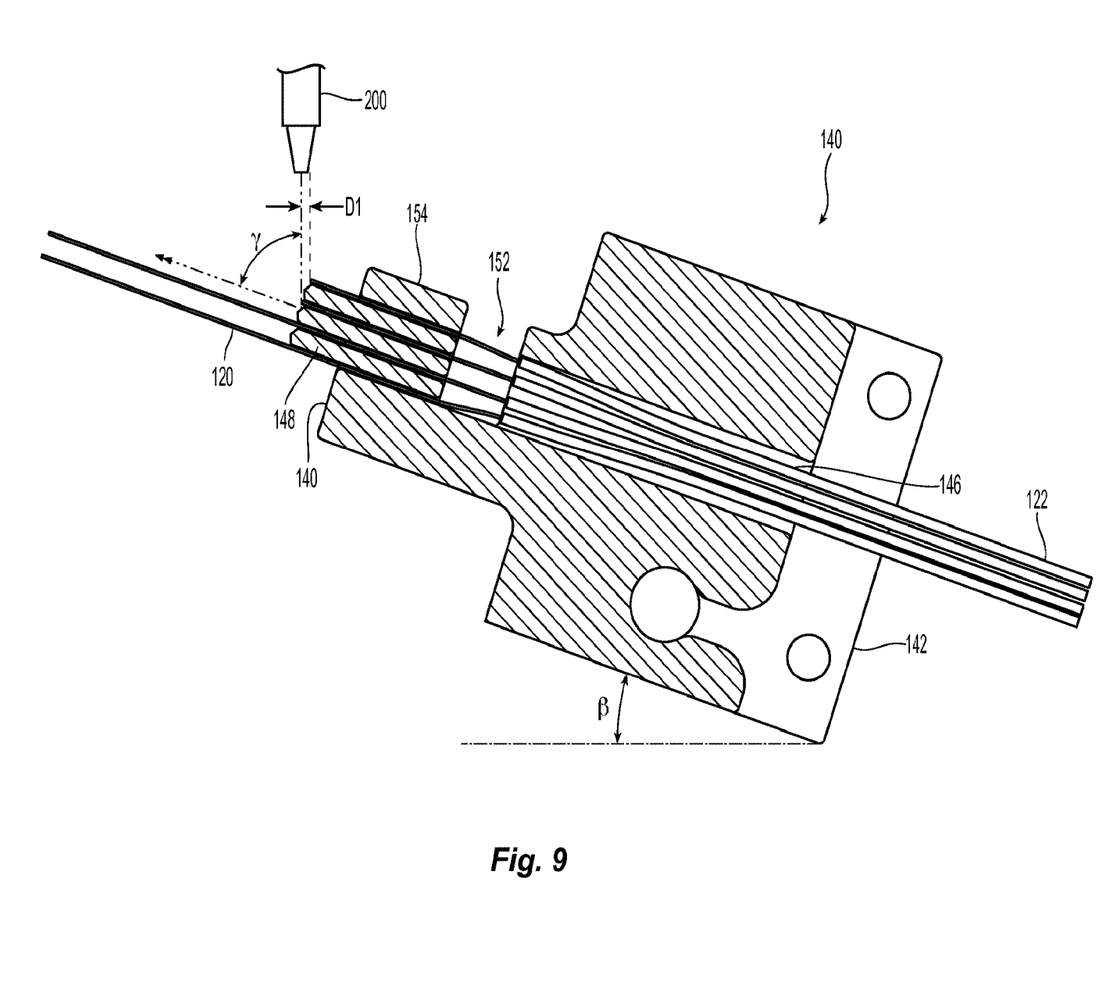
FIG. 9 is a cross section view of a cleaving device of FIG. 7 showing the cleaving laser cleaving a second row of optical fibers.

FIG. 9 illustrates the cleaving of the second row of optical fibers 120. In FIG. 9, the cleaving laser 200 has been moved by a distance D1, approximately 168 µm to the left as looking at FIG. 9, which assumes a 500 µm pitch between the rows of optical fibers (thickness of the planar members 148). Cleaving laser 200 then cleaves the optical fibers in the second row with the second planar member 148 protecting the third row of optical fibers 120. This process continues for the remaining number of rows of optical fibers 120.

Figure 10:
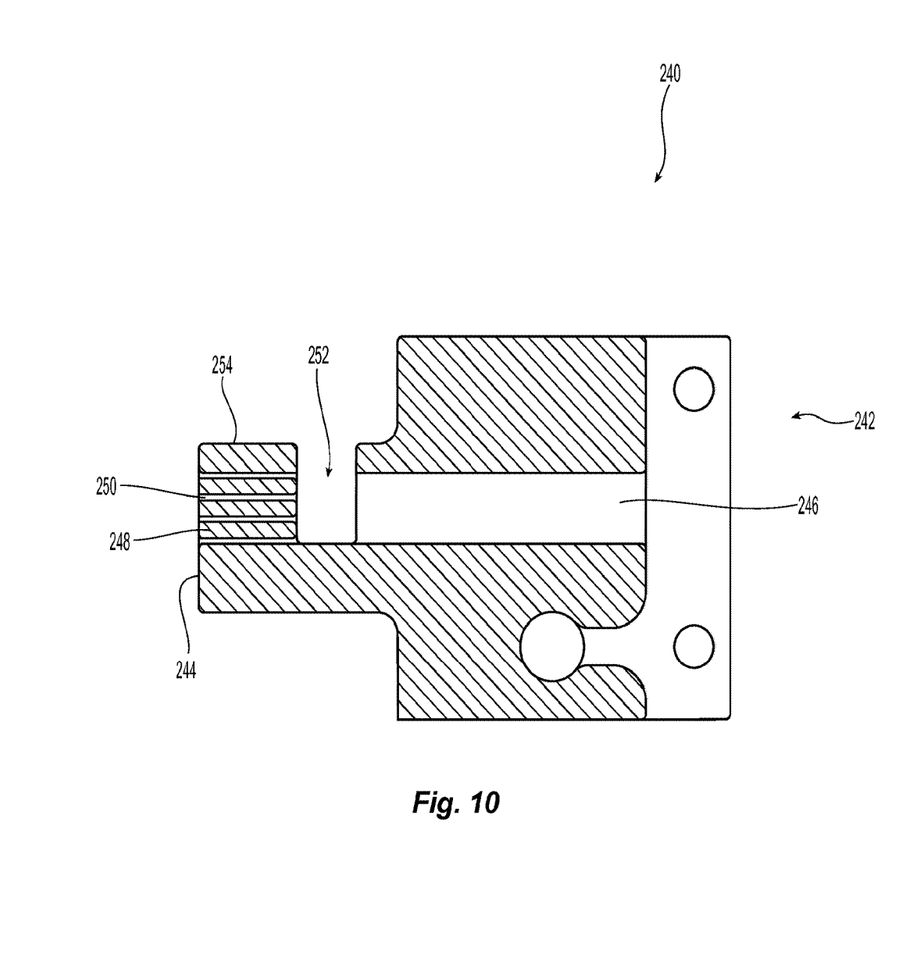
FIG. 10 is a cross section of a second embodiment of a cleaving device.

FIG. 10 illustrates a second embodiment of a cleaving device 240. The cleaving device 240 has a front end 244 and an opening 246 extending between the front end 244 and the back end 242. The optical fibers 122 extend from the handling device 100 through the opening 246 and extend beyond front end 244 of the cleaving device 240. In this figure too, the handling device 100 has not been included for clarity purposes. The cleaving device 240 has a plurality of planar members 248 disposed within the opening 246. The plurality of planar members 248 define a plurality of slots 250 adjacent the front end 244. Each of the plurality of slots 250 is sized to receive one of the fiber optic ribbons 122 or one row of optical fibers 120. The cleaving device 240 may also have an opening 252 extending downward from a top surface 254 that is in communication with the opening 246. The opening 252 provides a user access to assist with the fiber optic ribbons 122 being inserted into the opening 246 from the back end 242 and through the slots 250.

As noted above, the cleaving device 240 has planar members 248 disposed in the opening 246, but the planar members 248 do not extend beyond the front end 244. Additionally, the planar members 248 are thicker then the planar members 148 of the embodiment noted above. The cleaving device 240, along with the handling device 100, are also tilted at the predetermined angle α, approximately 18.6°, for cleaving of the optical fibers 120. In this case, with the increased space between the optical fibers (not shown in FIG. 10), the optical fibers below the optical fiber being cleaved are protected by this gap between the optical fibers. The appropriate distance between the optical fibers, which is also the thickness of the planar members 248, depends upon the cleaving laser being used. For example, when using a CO2 laser, the distance between the optical fibers should be about 500 microns, while it may be larger as well.

Figure 11:
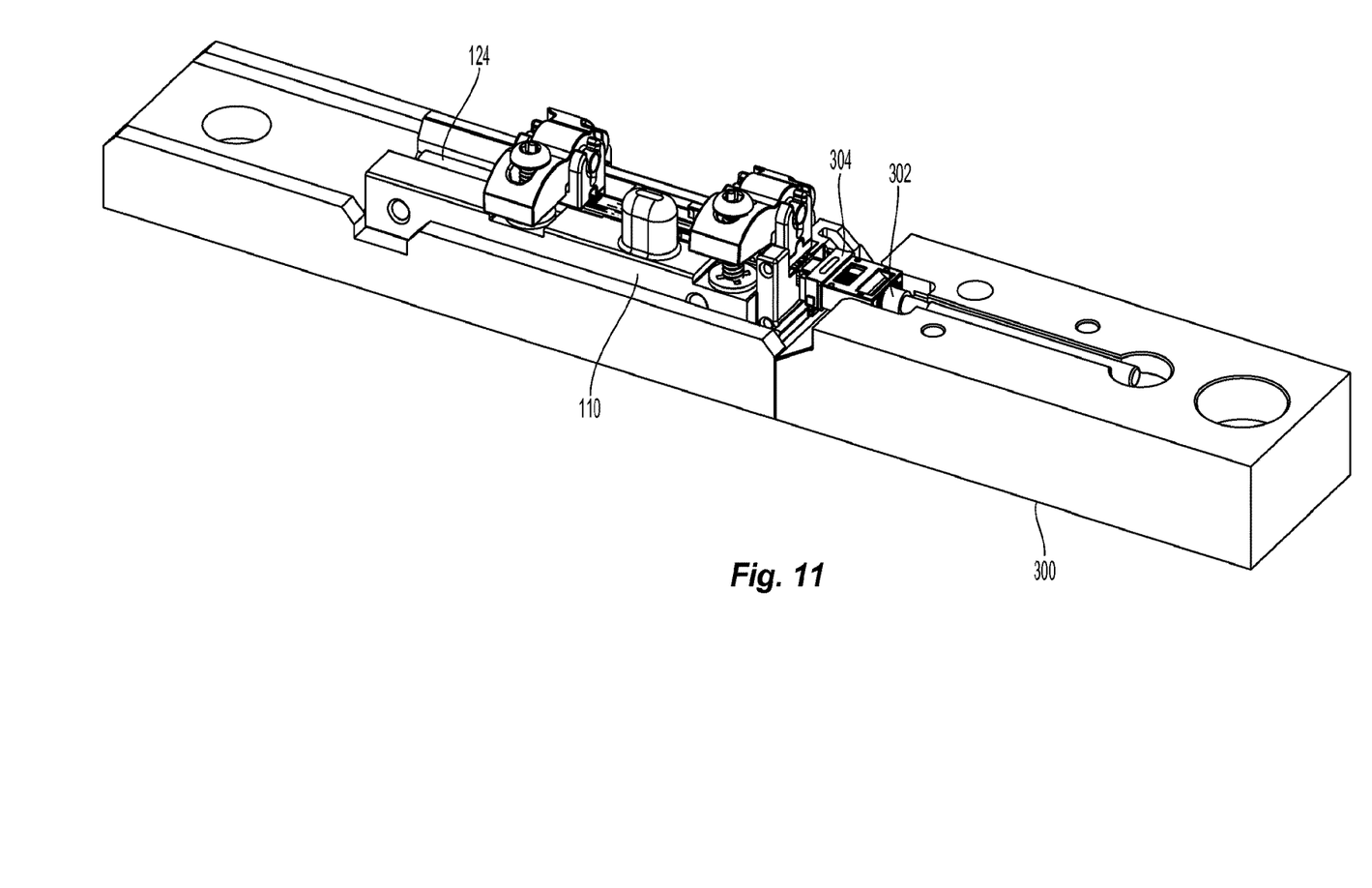
FIG. 11 is a perspective view of a handling device attached to an oven according to the present invention.
Figure 12:
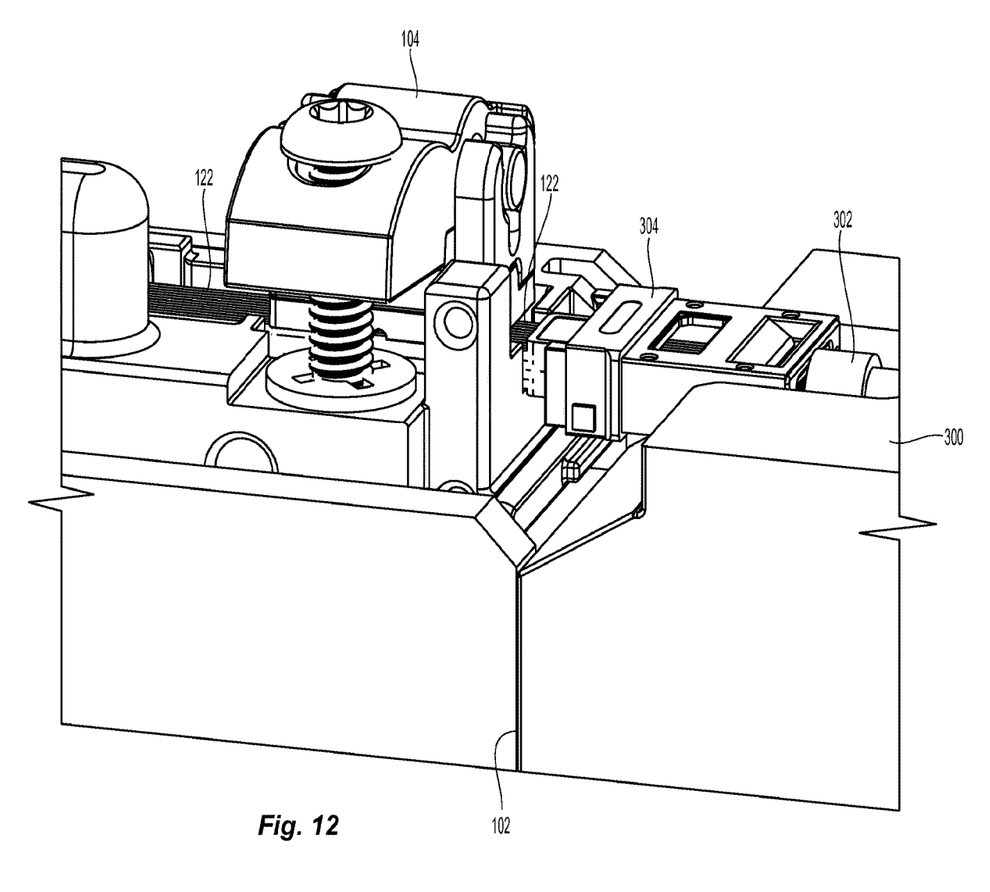
FIG. 12 is an enlarged view of the device in FIG. 10.

After all of the optical fibers 120 are cleaved, the cleaving device 140 is then removed from the handling device 100, and the optical fibers 120 are inserted into a fiber optic ferrule. An epoxy is inserted into the fiber optic ferrule, and the assembly is put into an oven. The kind of epoxy used, heat-cured or UV-cured, will dictate the type of oven used. As illustrated in FIG. 11, the handling device 100 with optical fibers 120 is attached to an oven 300 to cure the epoxy inserted into the fiber optic ferrule. A biasing member 302 is provided to bias the fiber optic ferrule against the optical fibers 120, thereby maintaining their position against the stop plane. See, e.g., FIG. 2. However, it is possible that the optical fibers disposed between the front top member 104 and the fiber optic ferrule may buckle as a result of the biasing force provided by biasing member 302. Buckling of the optical fibers 120 may affect the angle at which the optical fibers engage the stop plane. Therefore, an insert 304 maybe used to maintain the optical fibers 120 between the front top member 104 and the fiber optic ferrule in a straight line.

According to another embodiment, the plurality of fiber ribbons 122 could be otherwise held together—not using a handling device 100. For example, the ribbons could be bonded to one another by an adhesive, glue, epoxy, etc. However, a cleaving device such as the cleaving device 140 may be needed to have the optical fibers terminated in a consistent manner.

When the optical fibers 120 are jacketed, the above processes align the ends of all of the optical fibers 120 in the most efficient manner. However, when the optical fiber ribbons are loose relative to one another, the optical fibers could be stripped, cleaved and aligned separate and apart from one another. The ends of the optical fibers could then be aligned optically or mechanically and then clamped together prior to insertion into the fiber optic ferrule.

Applicant notes that the angle of tilt, ß, could be other than the noted 18.6° if the optical fibers needed an angled end face to reduce the back reflection of the light.

Figure 13:
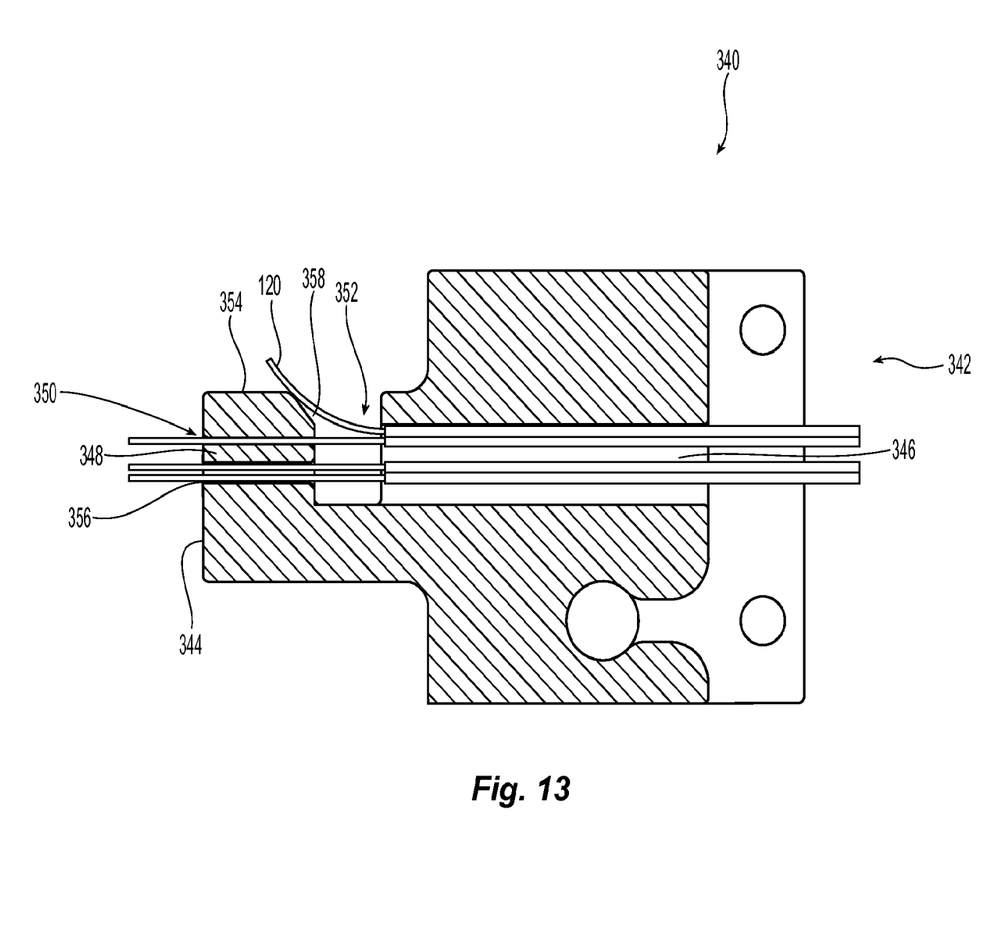
FIG. 13 is a cross section view of another embodiment of a cleaving device according the present invention.

FIG. 13 illustrates an alternative embodiment of a cleaving device 340. In this cleaving device 340, has a front end 344 and an opening 346 extending between the front end 344 and the back end 342. The optical fibers 122 extend from the handling device (not shown) through the opening 346 and extend beyond front end 344 of the cleaving device 340. The cleaving device 340 has one planar member 348 disposed within the opening 346. The planar member 348 defines two slots 350, 356 adjacent the front end 344. The first slot 350 is sized to receive one of the fiber optic ribbons 122 or one row of optical fibers 120. The second slot 356 is sized to receive three (or one less than the total number of rows of optical fibers to be cleaved). The cleaving device 340 also has an opening 352 extending downward from a top surface 354 that is in communication with the opening 346. The opening 352 provides a user access to assist with the fiber optic ribbons 122 being inserted into the opening 346 from the back end 342 and to provide optical fiber management.

With cleaving device 340, the optical fibers 120 are cleaved without the use of the extended planar members. Rather just one row of optical fibers 120 is presented for the laser at a time. When the first row of optical fibers 120 is to be cleaved, the top row of optical fibers 120 is inserted through the first slot 350 and the other rows of optical fibers are inserted through the larger second slot 356. The optical fibers 120 extending out of the second slot 356 can be bent downward and out of the way of the laser beam cleaving the top row of optical fibers. Once the top row of optical fibers is cleaved, then the cleaving device 340 can be removed from the handling device and the optical fibers 120. The cleaving device 340 can be reinstalled on the handling device (and the handling device would maintain its positional relationship with the laser) and the optical fibers 120 can be reinserted as illustrated in FIG. 13. That is, the first row of optical fibers 120, which have been cleaved, can be routed out of the opening 352 to keep them out of the way for the next row to be cleaved. The cleaving device 340 has a chamfered surface 358 that leads out of the opening 352 to assist in routing the cleaved optical fibers 120 out of the opening 352. The second row of optical fibers 120 is routed through the first slot 350 for cleaving and the bottom rows are routed through the larger second slot 356. Again, the bottom rows of optical fibers 120 will be pressed downward to move them out of the laser beam path. The second row is then cleaved and the movement of optical fibers 120 again occurs to cleave the third and then the fourth row of optical fibers 120. Alternatively, a lower third slot that curves downward away from the opening 352 may also be included in the cleaving device to assist in moving the lower rows of optical fibers out of the laser beam path.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A method of terminating a plurality of optical fibers comprising:
    assembling the plurality of optical fibers in a stack of at least two rows of optical fibers;
    retaining the stack of the plurality of optical fibers to prevent slipping of the optical fibers relative to one another in the stack;
    cleaving the plurality of optical fibers while the plurality of optical fibers are retained in the stack;
    inserting the plurality of optical fibers into a multi-fiber optical ferrule while the plurality of optical fibers are retained in the stack; and
    securing the plurality of optical fibers in the multi-fiber optical ferrule while the plurality of optical fibers are retained in the stack.

2. The method of terminating a plurality of optical fibers according to claim 1, wherein the step of retaining the stack of the plurality of optical fibers comprises bonding the rows of optical fibers to one another.

3. The method of terminating a plurality of optical fibers according to claim 1, wherein the step of securing the plurality of optical fibers comprises:
    applying adhesive to the plurality of optical fibers within the multi-fiber optical ferrule; and
    curing the adhesive in an oven.

4. The method of terminating a plurality of optical fibers according to claim 3, wherein the step of securing the plurality of optical fibers further comprises biasing the multi-fiber optical ferrule against the optical fibers.

5. The method of terminating a plurality of optical fibers according to claim 3, wherein the oven is selected from the group of a heat oven and a UV oven.

6. The method of terminating a plurality of optical fibers according to claim 1, wherein the step of securing the stack of a plurality of optical fibers comprises:
    providing a handling device having a base member and a top member, the base member having a channel therein to receive at least along a portion of a length thereof the stack of plurality of optical fibers; and
    moving the top member to engage an upper number of associated optical fibers and securing the stack of the plurality of optical fibers within the channel to prevent the slipping of the plurality of optical fibers relative to one another in the stack.

7. The method of terminating a plurality of optical fibers according to claim 6, wherein the top member is rotatably connected to the base member.

8. The method of terminating a plurality of optical fibers according to claim 1, the step of cleaving the plurality of optical fibers comprises:
    orienting the stack of the plurality of optical fibers at a predetermined angle to a cleaving laser;
    cleaving a first row of the optical fibers;
    moving the cleaving laser relative to the stack of optical fibers; and
    cleaving a second row of the optical fibers.

9. The method of terminating a plurality of optical fibers according to claim 8, further comprising the step of:
    providing a cleaving device for attachment to the handling device, the cleaving device having a plurality of planar members defining a plurality of slots adjacent the front end, each of the plurality of slots configured to receive a single row of the stack of optical fibers, the planar members protecting an adjacent row of optical fibers from the cleaving laser.

10. The method of terminating a plurality of optical fibers according to claim 8, wherein the plurality of optical fibers comprise a plurality of optical fiber ribbons, each of the plurality of optical fiber ribbons having a plurality of optical fibers.

11. The method of terminating a plurality of optical fibers according to claim 8, wherein the predetermined angle is between 10 and 30°.

12. The method of terminating a plurality of optical fibers according to claim 8, wherein the predetermined angle is between 15 and 20°.

13. The method of terminating a plurality of optical fibers according to claim 8, wherein the predetermined angle is about 18.6°.

14. The method of terminating a plurality of optical fibers according to claim 8, wherein a single rows of optical fibers other than the row of optical fibers being cleaved are removed from a path made by a cleaving laser.

15. The method of terminating a plurality of optical fibers according to claim 1, wherein end portions of the plurality of optical fibers are bare.

16. The method of terminating a plurality of optical fibers according to claim 1, wherein end portions of the plurality of optical fibers have a coplanarity better than 50 microns.

17. A method of terminating a plurality of optical fibers comprising:
    assembling the plurality of optical fibers in a stack of at least two rows of optical fibers;

retaining the stack of the plurality of optical fibers to prevent slipping of the optical fibers relative to one another in the stack by bonding the rows of optical fibers to one another;

cleaving the plurality of optical fibers while the plurality of optical fibers are retained in the stack;

inserting the plurality of optical fibers into a multi-fiber optical ferrule while the plurality of optical fibers are retained in the stack; and securing the plurality of optical fibers in the multi-fiber optical ferrule while the plurality of optical fibers are retained in the stack.

18. A method of terminating a plurality of optical fibers comprising:

assembling the plurality of optical fibers in a stack of at least two rows of optical fibers;

retaining the stack of the plurality of optical fibers to prevent slipping of the optical fibers relative to one another in the stack, the retaining further comprising the steps of: applying adhesive to the plurality of optical fibers within the multi-fiber optical ferrule; and curing the adhesive in an oven;

cleaving the plurality of optical fibers while the plurality of optical fibers are retained in the stack;

inserting the plurality of optical fibers into a multi-fiber optical ferrule while the plurality of optical fibers are retained in the stack; and securing the plurality of optical fibers in the multi-fiber optical ferrule while the plurality of optical fibers are retained in the stack while biasing the multi-fiber optical ferrule against the optical fibers.

* * * * *

UNITED STATES PATENT AND TRADEMARK OFFICE
CERTIFICATE OF CORRECTION

PATENT NO. : 10,162,122 B2  
APPLICATION NO. : 15/617868  
DATED : December 25, 2018  
INVENTOR(S) : Childers et al.

Page 1 of 1

It is certified that error appears in the above-identified patent and that said Letters Patent is hereby corrected as shown below:

On the Title Page

Under item (63), "Related U.S. Application Data," Pat. No. 96,782,818 should be changed to --Pat. No. 9,678,281--

Signed and Sealed this
Nineteenth Day of February, 2019

Andrei Iancu
*Director of the United States Patent and Trademark Office*